US012808491B2

(12) United States Patent
Friedrichs et al.

(10) Patent No.: US 12,808,491 B2
(45) Date of Patent: Nov. 24, 2026

(54) AUTOMATED SWITCHOVER DEVICE

(71) Applicant: Controls Corporation of America, Virginia Beach, VA (US)

(72) Inventors: John Friedrichs, Virginia Beach, VA (US); Georg Dukas, Virginia Beach, VA (US); Richard Beacham, Norfolk, VA (US); Allen Hartgraves, Virginia Beach, VA (US)

(73) Assignee: Controls Corporation of America, Virginia Beach, VA (US)

( * ) Notice: Subject to any disclaimer, the term of this patent is extended or adjusted under 35 U.S.C. 154(b) by 150 days.

(21) Appl. No.: 18/983,606

(22) Filed: Dec. 17, 2024

(65) Prior Publication Data

US 2026/0168627 A1 Jun. 18, 2026

(51) Int. Cl.
*F17C 13/04* (2006.01)

(52) U.S. Cl.
CPC .... *F17C 13/045* (2013.01); *F17C 2201/0119* (2013.01); *F17C 2205/0146* (2013.01); *F17C 2205/0326* (2013.01)

(58) Field of Classification Search
CPC ............ F17C 13/045; F17C 2201/0119; F17C 2205/0146; F17C 2205/0326
USPC ............................................ 137/605, 614.15
See application file for complete search history.

(56) References Cited

U.S. PATENT DOCUMENTS 1,539,885 A 6/1925 Thompson
1,783,395 A 12/1930 Taylor
2,076,588 A 4/1937 Pearson
2,404,674 A 7/1946 Ohlsen
2,452,573 A 11/1948 Johnson et al.
2,909,219 A 10/1959 Matthews
3,088,293 A 5/1963 Henderson
3,150,536 A 9/1964 Plume
3,520,387 A 7/1970 Natschke
3,658,081 A 4/1972 Renaudie
3,896,837 A 7/1975 Rohling
(Continued)

FOREIGN PATENT DOCUMENTS

CN 2152992 Y 1/1994
CN 2211013 Y 10/1995
(Continued)

*Primary Examiner* — Marina A Tietjen
(74) *Attorney, Agent, or Firm* — MILES & STOCKBRIDGE P.C.; David R. Schaffer

(57) ABSTRACT

An automated switchover device including a spring biased switchover regulator having a first inlet for receiving a first source of gas supply in the first inlet and a second inlet for receiving a second source of gas supply in the second inlet and an outlet shared by the first inlet and the second inlet. The device may include a motor and an adjusting screw coupled to the motor. The spring biased switchover regulator is configured to monitor and control a maximum and minimum pressure of the first inlet and the second inlet. The motor is configured to turn the adjusting screw in a first rotational direction or a second rotational direction based on a maximum and minimum pressure of the first inlet and the second inlet. The spring biased switchover regulator is configured to switch over from the first source of gas to the second source of gas due to the actuation of the adjusting screw by the motor to automatically provide a continuous gas supply.

20 Claims, 10 Drawing Sheets

(56) References Cited

U.S. PATENT DOCUMENTS

| | | | | |
|---|---|---|---|---|
| 4,173,104 | A | 11/1979 | Koll | |
| 4,267,458 | A | 5/1981 | Uram et al. | |
| 4,936,340 | A * | 6/1990 | Potter | G05D 16/202 251/129.11 |
| 5,014,733 | A | 5/1991 | Wilson | |
| 5,183,072 | A * | 2/1993 | Pengler | F17C 13/045 137/113 |
| 5,676,180 | A | 10/1997 | Teel | |
| 6,105,598 | A * | 8/2000 | Cabrera | F17C 13/04 137/907 |
| 6,450,217 | B2 | 9/2002 | Mutter | |
| 6,662,819 | B1 * | 12/2003 | Watson | F17C 13/045 137/113 |
| 2002/0007864 | A1 | 1/2002 | Durkin et al. | |
| 2003/0109058 | A1 | 6/2003 | Bolam | |
| 2011/0152849 | A1 | 6/2011 | Baust et al. | |
| 2011/0270483 | A1 | 11/2011 | Endo et al. | |
| 2014/0216080 | A1 | 8/2014 | Doty | |
| 2017/0086281 | A1 | 3/2017 | Avrahamy | |
| 2017/0328607 | A1 | 11/2017 | Burk | |

FOREIGN PATENT DOCUMENTS

| | | | |
|---|---|---|---|
| CN | 2369102 | Y | 3/2000 |
| CN | 2564899 | Y | 8/2003 |
| CN | 2826101 | Y | 10/2006 |
| CN | 104613203 | A | 5/2015 |
| CN | 106773649 | A | 5/2017 |
| CN | 210243065 | U | 4/2020 |
| CN | 213393291 | U | 6/2021 |
| DE | 2237597 | A1 | 2/1974 |
| EP | 3018283 | A1 | 5/2016 |
| FR | 1327065 | A | 5/1963 |
| GB | 529408 | | 11/1940 |
| GB | 957267 | | 5/1964 |
| KR | 200152585 | Y1 | 7/1999 |

* cited by examiner

AUTOMATED SWITCHOVER DEVICE

BACKGROUND

Field of the Invention

The present disclosure relates generally to automated systems and devices for providing continuous gas supply.

Background of the Invention

Typical switchover systems and devices on the market rely on manually controlled spring bias, dome loading, and/or solenoid valves to accomplish the switching such as from one bank of a gas supply to another. Such typical prior art systems, for example, those utilizing electric solenoid valve models, will either open one or more gas supply sides and deplete all of its gas supply at the same time or close the sides, and the downstream application will no longer receive any gas. Hence, prior art systems are susceptible to shutting down their entire system(s). Thus, there is a need for fully automatic switch over systems and devices having fully automatic capability.

SUMMARY

According to first broad aspect, the present disclosure provides an automated switchover device comprising: a spring biased switchover regulator having a first inlet for receiving a first source of gas supply in the first inlet and a second inlet for receiving a second source of gas supply in the second inlet and an outlet shared by the first inlet and the second inlet; a motor; and an adjusting screw coupled to the motor; wherein the spring biased switchover regulator is configured to monitor and control a maximum and minimum pressure of the first inlet and the second inlet, wherein the motor is configured to turn the adjusting screw in a first rotational direction or a second rotational direction based on a maximum and minimum pressure of the first inlet and the second inlet, wherein the spring biased switchover regulator is configured to switch over from the first source of gas to the second source of gas due to the actuation of the adjusting screw by the motor to automatically provide a continuous gas supply.

According to a second broad aspect, the present disclosure provides an automated switchover device comprising: a spring biased switchover regulator having a first inlet for receiving a first source of gas supply in the first inlet and a second inlet for receiving a second source of gas supply in the second inlet and an outlet shared by the first inlet and the second inlet; a motor; a compensating spring assembly coupled to the spring biased switchover regulator, wherein the compensating spring assembly comprises a compensating spring and a motor, wherein the compensating spring is in communication with the motor; and an adjusting screw coupled to the motor, wherein the spring biased switchover regulator is configured to monitor and control a maximum and minimum pressure of the first inlet and the second inlet, wherein the motor is configured to turn the adjusting screw in a first rotational direction or a second rotational direction based on a maximum and minimum pressure of the first inlet and the second inlet, wherein the spring biased switchover regulator is configured to switch over from the first source of gas to the second source of gas due to the actuation of the adjusting screw by the motor to automatically provide a continuous gas supply.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the invention.

DETAILED DESCRIPTION OF THE INVENTION

Definitions

Figure 1:
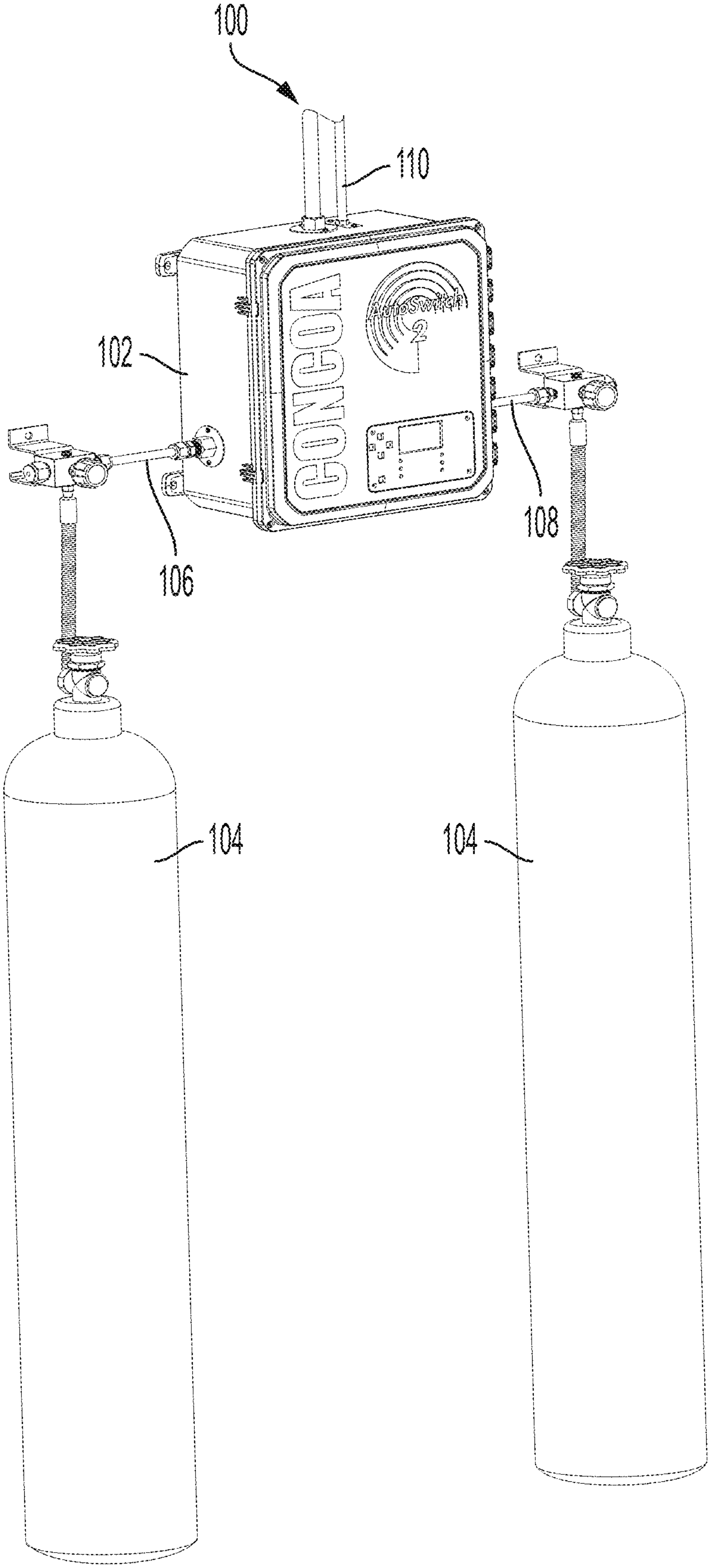
FIG. 1 illustrates a fully automatic switchover system according to one embodiment of the present disclosure.

Where the definition of terms departs from the commonly used meaning of the term, applicant intends to utilize the definitions provided below, unless specifically indicated.

It is to be understood that the foregoing general description and the following detailed description are exemplary and explanatory only and are not restrictive of any subject matter claimed. In this application, the use of the singular includes the plural unless specifically stated otherwise. It must be noted that, as used in the specification and the appended claims, the singular forms "a," "an" and "the" include plural referents unless the context clearly dictates otherwise. In this application, the use of "or" means "and/or" unless stated otherwise. Furthermore, use of the term "including" as well as other forms, such as "include", "includes," and "included," is not limiting.

For purposes of the present disclosure, the term "comprising", the term "having", the term "including," and variations of these words are intended to be open-ended and mean that there may be additional elements other than the listed elements.

For purposes of the present disclosure, directional terms such as "top," "bottom," "upper," "lower," "above," "below," "left," "right," "horizontal," "vertical," "up,"

"down," etc., are used merely for convenience in describing the various embodiments of the present disclosure. The embodiments of the present disclosure may be oriented in various ways. For example, the diagrams, apparatuses, etc., shown in the drawing figures may be flipped over, rotated by 90° in any direction, reversed, etc.

For purposes of the present disclosure, a value or property is "based" on a particular value, property, the satisfaction of a condition, or other factor, if that value is derived by performing a mathematical calculation or logical decision using that value, property or other factor.

For purposes of the present disclosure, it should be noted that to provide a more concise description, some of the quantitative expressions given herein are not qualified with the term "about." It is understood that whether the term "about" is used explicitly or not, every quantity given herein is meant to refer to the actual given value, and it is also meant to refer to the approximation to such given value that would reasonably be inferred based on the ordinary skill in the art, including approximations due to the experimental and/or measurement conditions for such given value.

For purposes of the present disclosure, the term "compensating spring" refers to a spring that exerts equal and opposite force on threads of an adjusting screw to reduce the torque required to turn the adjusting screw to nearly zero.

DESCRIPTION

While the invention is susceptible to various modifications and alternative forms, specific embodiment thereof has been shown by way of example in the drawings and will be described in detail below. It should be understood, however that it is not intended to limit the invention to the particular forms disclosed, but on the contrary, the invention is to cover all modifications, equivalents, and alternatives falling within the spirit and the scope of the invention.

The disclosed device employs a novel approach that utilizes a motor to automatically control a spring bias switchover system. Some disclosed embodiments may employ a compensating spring in the spring bias system to greatly reduce the torque required for the motor to switch banks of gas supply reserves. One of the unique characteristics of the disclosed fully automatic switchover device includes a feature for addressing power failure(s) such that if the power fails, the disclosed fully automatic switchover device continues to operate as a spring biased switchover system. In other applications, the disclosed invention may automatically switch over from one reduced or depleted gas supply source to a fuller gas supply source. This may allow a user to replace the reduced or depleted gas supply source without interrupting the continuous gas supply to the system.

Turning to FIG. 1, the disclosed invention provides a fully automatic switchover system 100 designed to provide a continuous supply of gas. In some embodiments, but not limited to, the disclosed invention may provide continuous supply of high purity gas. (Pure gases may be classified by grade. Gases may be ranked by the percentage of pure gas in the cylinders. For example, grade 4 gas is 99.99% pure (4 nines) and grade 5 gas is 99.999% pure. If a gas is grade 4.8 it is 99.998% pure.)

In FIG. 1, aa fully automatic switchover device 102 may be coupled to a gas supply such as gas cylinders 104. Although FIG. 1 illustrates one gas cylinder 104 per side, the described configuration is merely an exemplary minimum requirement and should not be conveyed as limiting. Either side can have many more cylinders attached via a manifold or other plumbing to provide gas from every gas cylinder 104 on each side into separate common inlets 106, 108 in automatic switchover device 102 via common inlets 106, 108. Thus, while two gas cylinders 104 are illustrated in FIG. 1, it is readily appreciated that more than one or two cylinders, and even including, for example, multiple cylinders (such as an arrangement of cylinders coupled together or arranged in series or parallel) or even a bank of gas cylinders 104 on each side may be configured to supply gas to fully automatic switchover device 102 such as via supply connections 106, 108.

Fully automatic switchover device 102 may be electrically connected to a power source (not shown). In some embodiments, item 110 is a relief valve vent pipe. Should the delivery regulator inside of the disclosed system fail, gas that would normally vent inside the enclosure and/or out into the atmosphere, can be piped away via an open port provided at the top of the enclosure. Item 110 is showing a piped away relief valve. In some preferred embodiments, the gas supply is coupled to fully automatic switchover device 102 from more than one source to provide a continuous supply of high purity gas, for example, should one source fail or run out. Fully automatic switchover device 102 is rated to have a leak integrity of approximately $1\times10^{-9}$ cc/see of helium. Embodiments of fully automatic switchover system 100 may utilize any purity gas including high purity gas.

Figure 2:
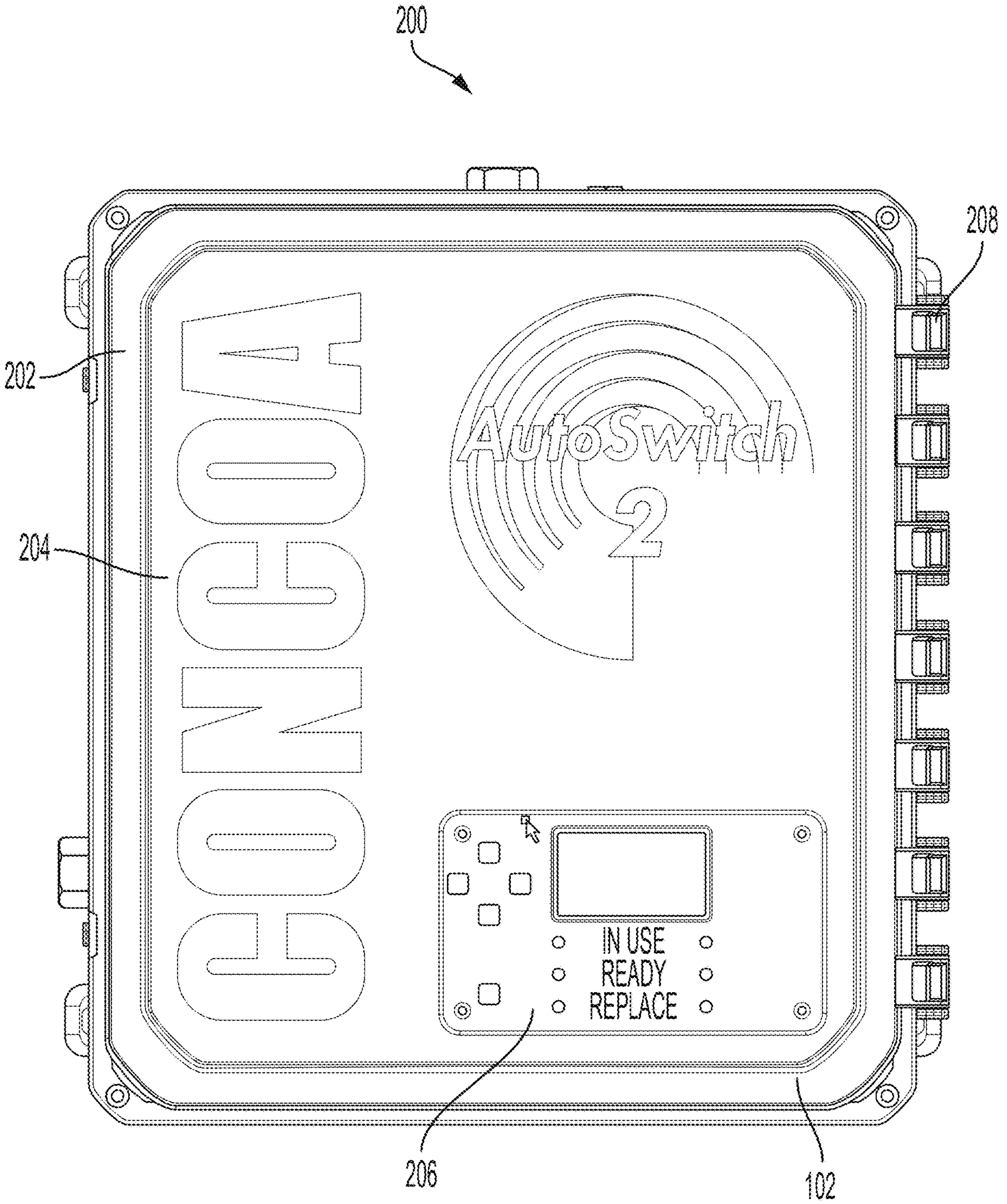
FIG. 2 illustrates a front view of a fully automatic switchover device according to one embodiment of the present disclosure.

FIG. 2 illustrates a front view 200 of fully automatic switchover device 102. In one embodiment, fully automatic switchover device 102 may be encapsulated by a protective case 202. Protective case 202 may include an access door 204 for gaining access to an interior of fully automatic switchover device 102. In one embodiment, access door 204 may be pivotably attached to protective case 202, for example, by door hinges 208. In some embodiments, a display panel 206 may be built into fully automatic switchover device 102 such as being disposed on a front face of access door 204.

Figure 3:
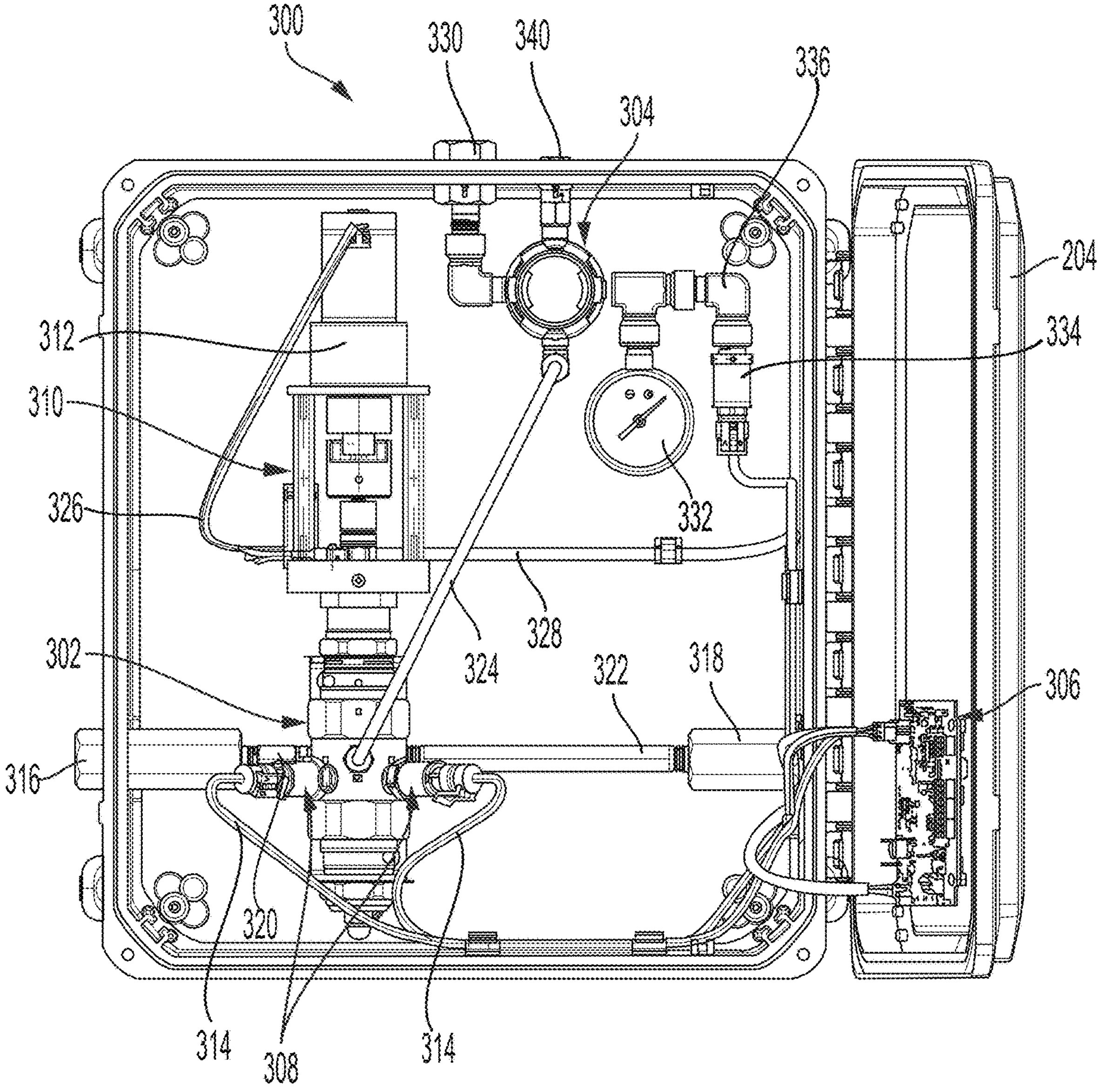
FIG. 3 illustrates an interior view of the fully automatic switchover device of FIG. 2 according to one embodiment of the present disclosure.

FIG. 3 illustrates an internal view 300 of fully automatic switchover device 102 wherein access door 204 is in an open configuration. Internal components of fully automatic switchover device 102 may include a spring biased switchover regulator 302. An embodiment of spring biased switchover regulator 302 may include an integral compensation spring and motor control 310 as further described below. Fully automatic switchover device 102 may include a final line regulator 304 for controlling downstream pressure to a final application (such as any application for which a user requires pressure including, for example, unlimited applications in cutting, welding, analytical, lasers, shielding, distribution systems, etc.) (not shown). An outlet bulkhead 330 is an external connection point for a user to connect fully automatic switchover device 102 to an application. The outlet bulkhead 330 provides stable outlet pressure from the outlet of the final line regulator 304 to the application. One or more embodiments may include an outlet pressure gauge 332 for final line regulator 304, which shows the stable outlet pressure provided through bulkhead 330 to a final user application.

A connection elbow 336 is provided to connectively attach an outlet pressure transducer 334 to the final line regulator 304. Outlet pressure transducer 334 provides current/voltage to a control board 306 that converts to pressure based on current/voltage.

Final line regulator item 304 may be configured to obtain inlet pressure from the switch regulator 302 via a tube 324. This inlet pressure will vary based on which bank of cylinders 104 is active; therefore, to provide a constant outlet pressure, the final line regulator 304 is needed. The final line regulator 304 can be adjusted by a user to provide constant outlet pressure through the outlet port 330 to an application. A relief valve 340 provides for venting pressure when line regulator 304 encounters excess pressure. Thus, if final line regulator 304 fails for any reason, relief valve 340 will vent gas through outlet port 330. Users may attach plumbing to this port to vent outside to a safe location.

Fully automatic switchover device 102 may include control board 306 configured for monitoring inlet pressure and outlet pressure of a gas reservoir such as an exemplary configuration of a right and left bank of gas cylinders 104 (see FIG. 1). As explained earlier, while FIG. 1 illustrates one gas cylinder 104 per side, the described configuration is merely an exemplary minimum requirement and should not be conveyed as limiting. Either side can have many more cylinders attached via a manifold or other plumbing to provide gas from every gas cylinder 104 on each side into the common inlet in automatic switchover device 102 via inlets 106, 108. Returning to FIG. 3, control board 306 may determine when to energize a motor 312 to switch spring biased switchover regulator 302 from one bank of gas cylinders 104 to the other. Control board 306 has inputs for monitoring both inlet pressures as well as outlet pressure. In some disclosed applications, these can be in the form of 4-20 mA transducers, other 4-20 mA signals, and/or digital signals from pressure switches or other input devices.

In FIG. 3, transducers 308 are fluidly connected to spring biased switchover regulator 302 for reading inlet pressure from gas cylinders 104 in order to monitor the pressure values from each gas cylinder 104. A left inlet bulkhead 316 allows gas to come into the spring biased switchover regulator 302 from gas cylinder 104 on a left side of fully automatic switchover device 102. A left inlet pipe nipple 320 connects left inlet bulkhead 316 to spring biased switchover regulator 302. Input gas coming from the left gas cylinder 104 through left inlet bulkhead 316 via left inlet pipe nipple 320 is monitored by the left most pressure transducer 308. Pressure transducers send a current and/or voltage to the control board based on what pressure is applied to the pressure transducer. The control board 306 converts this signal current and/or voltage into its equivalent pressure for use in determining what pressure is in the tanks. A right inlet bulkhead 318 allows gas to come into the spring biased switchover regulator 302 from the right gas cylinder 104. A right inlet pipe nipple 322 connects right inlet bulkhead item 318 to spring biased switchover regulator 302. Similarly, the gas coming from the right gas cylinder 104 through right inlet bulkhead 318 via right inlet pipe nipple 322 is monitored by the rightmost pressure transducer 308. Cable(s) 314 transfer the pressure transducer current and/or voltage for each of the left and right gas cylinders 104 to the control board item 306. The control board 306 converts this current and/or voltage back into its equivalent pressure for use in determining status of inlet pressures from the left and right gas cylinders 104. Tube 324 may connect and provide varying outlet pressure of the spring biased switchover regulator 302 to the inlet of the final line regulator 304. A switch and motor control cable assembly 326, 328 provides signals on the status of micro-switches 606 (best seen in FIG. 6) to the control board 306 and provides motor 312 with control signals from the control board 306.

Figure 4:
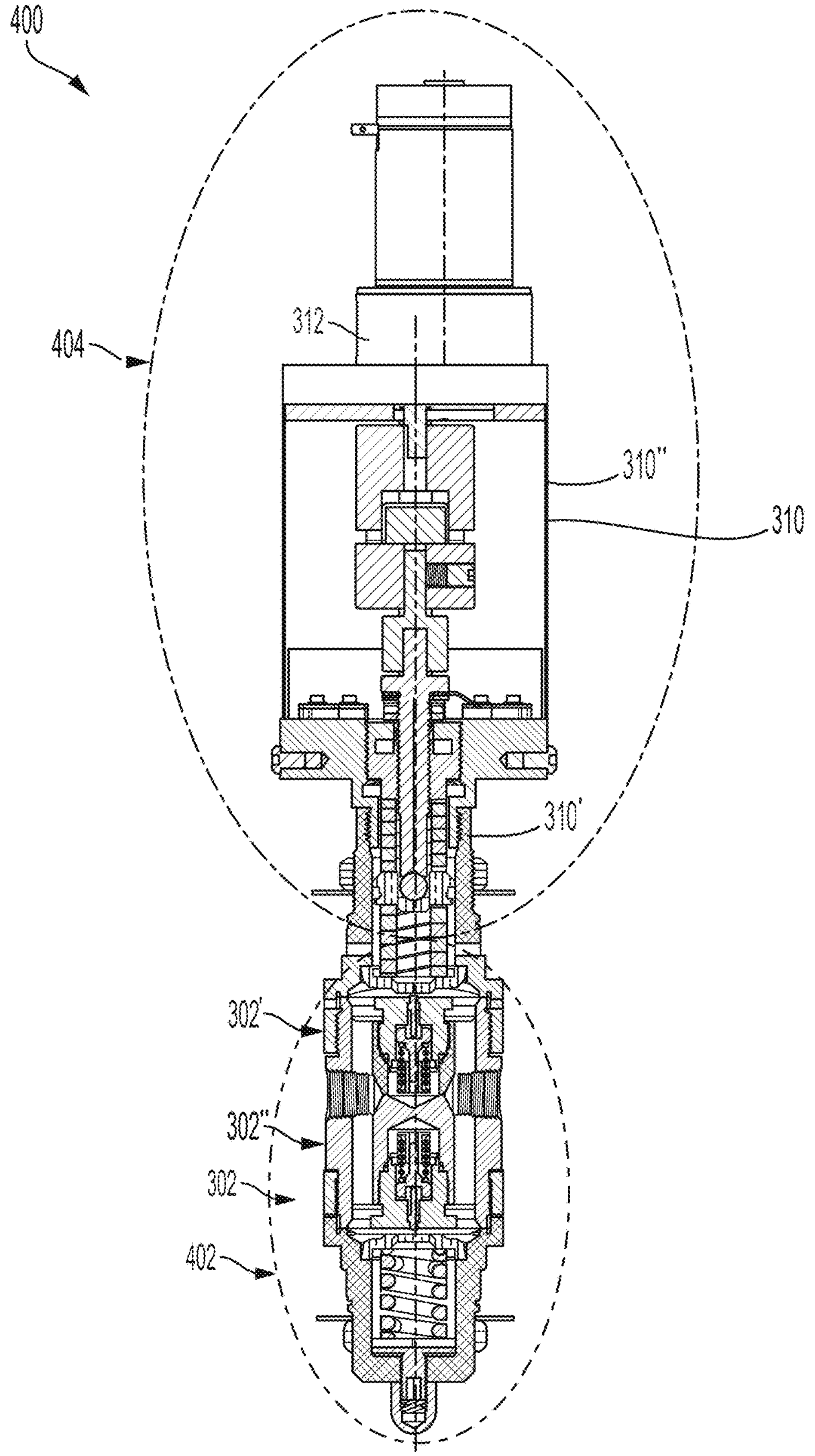
FIG. 4 illustrates a motor-controlled spring biased switchover regulator with a compensating spring assembly according to one embodiment of the present disclosure

FIG. 4 illustrates the motor-controlled spring biased switchover regulator with a compensating spring assembly 400 showing an internal view 402 of spring biased switchover regulator 302 and an internal view 404 of compensating spring and motor control 310. Compensating spring and motor control 310 includes a compensating spring portion 310' connected to and in communication with a motor control portion 310", which are connected to spring biased switchover regulator 302. Spring biased switchover regulator 302 includes a right bank motor controlled switch regulator 302' and a left bank preset regulator 302".

Figure 5:
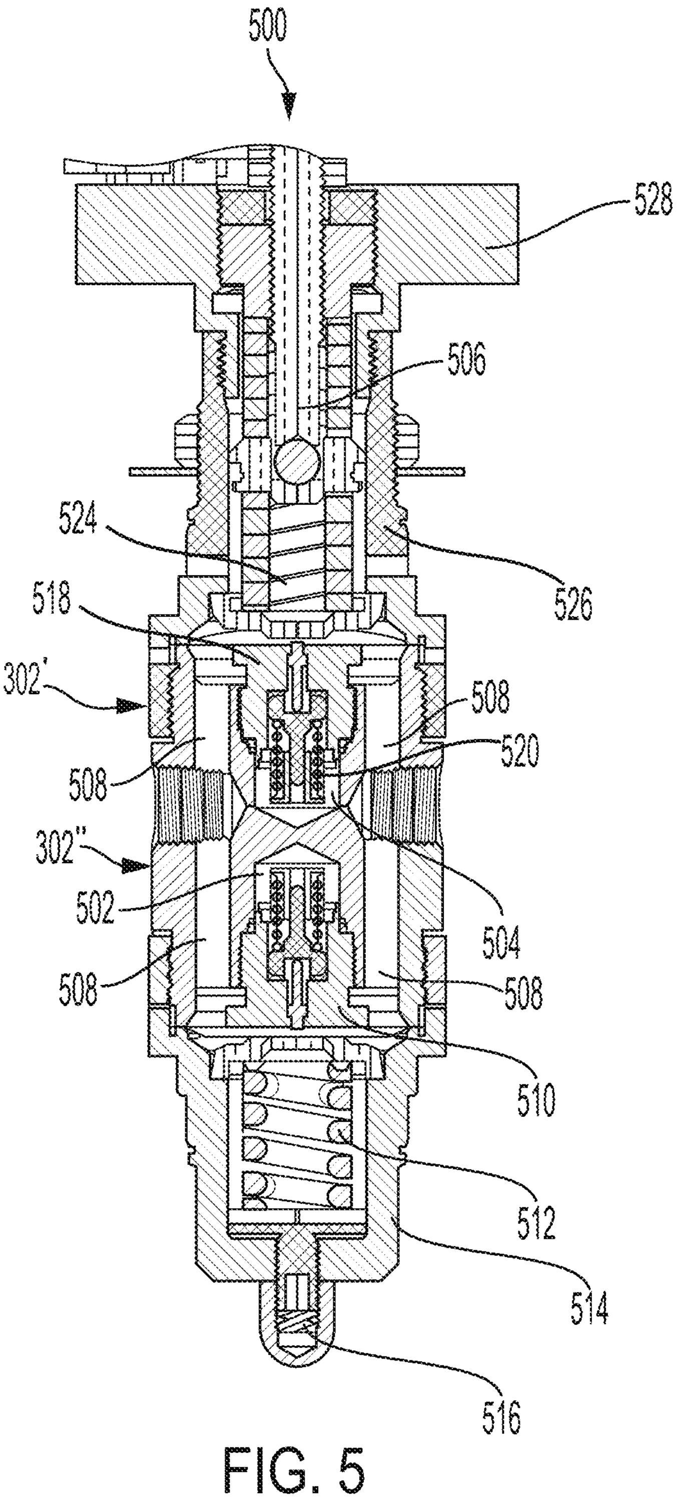
FIG. 5 illustrates a close up view of the interior view of a spring biased switchover regulator according to one embodiment of the present disclosure.

FIG. 5 illustrates a close up view 500 of the internal view 402 of spring biased switchover regulator 302. In one embodiment, high pressure gas may be configured to enter from the right bank of gas cylinders 104 into the spring biased switchover regulator 302 on an inlet side 504 of spring biased switchover regulator 302. The outlet pressure of spring biased switchover regulator 302 is set to control a MAX pressure and a MIN pressure. An adjusting screw 506 may be coupled to motor 312 and configured to rotate clockwise or counterclockwise by motor 312 when enacted. MAX pressure may be achieved when the motor 312 moves the adjusting screw 506 fully clockwise until a micro-switch engages (as described in further detail below). Such engagement of the micro-switch indicates that spring biased switchover regulator 302 is at MAX pressure. Likewise, MIN pressure may be achieved when the motor 312 moves the adjusting screw 506 fully counterclockwise until another micro-switch engages. This respective engagement of the other micro-switch indicates that spring biased switchover regulator 302 is at MIN pressure.

High pressure gas may be configured to enter from the left bank of gas cylinders 104 into spring biased switchover regulator 302 on an inlet side 502 of a preset regulator main seat assembly 510. Preset regulator main seat assembly 510 is illustrated at the main seat on the bottom half of the spring biased switchover regulator 302. Some embodiments of preset regulator main seat assembly 510 may employ a capsule design, however, it is readily appreciated that preset regulator main seat assembly 510 does not have to be a capsule per se, as some embodiments may utilize a design including, for example, but not limited to, individual seat components. Preset regulator main seat assembly 510 is designed to open and close to regulate outlet pressure of the spring biased switchover regulator 302 based on the tension of a preset regulator adjusting spring 512, which is positioned within a preset regulator adjusting spring bonnet 514. Preset regulator adjusting spring 512, which is positioned in a bottom portion of and extends through an into an inside of the preset regulator adjusting spring 512 and provides tension to open and close preset regulator main seat assembly 510. Thus, the main seat on preset regulator main seat assembly 510 opens and closes based on the tension in the preset regulator adjusting spring 512. This tension is adjusted by turning a preset adjusting screw 516. The outlet pressure of the left bank preset regulator 302' is preset at an average pressure between the MAX and MIN positions of the right bank motor controlled switch regulator 302' described above.

High pressure gas may be configured to enter from the right bank of gas cylinders 104 into spring biased switchover regulator 302 on an inlet side 520 of a motor controlled regulator main seat assembly 518. Motor controlled regulator main seat assembly 518 may be regarded as a motor controlled adjustable regulator. In one disclosed embodiment, motor controlled regulator main seat assembly 518 may be configured as the main seat on the top half of spring biased switchover regulator 302. Some embodiments of motor controlled regulator main seat assembly 518 may employ a capsule design, however, it is readily appreciated that motor controlled regulator main seat assembly 518 does not have to be a capsule per se, as some embodiments may utilize a design including, for example, but not limited to, individual seat components. Thus, the motor controlled regulator main seat assembly 518 opens and closes based on the tension in a motor controlled regulator adjusting spring 524 that is configured to contact a top end of the motor controlled regulator main seat assembly 518. Motor controlled regulator adjusting spring 524 provides tension to the motor controlled regulator main seat assembly 518.

A motor controlled regulator bonnet 526 houses motor controlled regulator main seat assembly 518 components. Bonnet cap 528 acts as a motor mounting flange to mount motor 312 to spring biased switchover regulator 302.

Both the right bank motor controlled switch regulator 302' and the left bank preset regulator 302" share an outlet cavity 508 in spring biased switchover regulator 302. Disclosed embodiments may provide this configuration, for example, but not limited to, in a single regulator body as in spring biased switchover regulator 302, but it may also be embodied in another configuration including, for example, as two independent regulators coupled together with a common outlet cavity. By sharing an outlet cavity, the right bank motor controlled switch regulator 302' or the left bank preset regulator 302" with the higher outlet pressure prevents the other regulator from flowing gas. Therefore, when the MAX pressure is dialed in on the right bank motor controlled switch regulator 302', the left bank preset regulator 302" will not flow gas until the right bank of gas cylinders 104 becomes empty and can no longer maintain the MAX pressure in its outlet cavity. At this point, the left bank of gas cylinders 104 takes over and the motor 312 turns the right bank of cylinders 104 to MIN pressure. At MIN pressure, the right bank of cylinders can be changed out. Once replaced, the MIN pressure of the right bank of cylinders 104 is less than the left bank of cylinders 104 preset pressure. When the left bank of cylinders 104 can no longer support the preset pressure, the right bank of cylinders 104 pressure takes over. Thus, in one example, should the pressure in the left inlet bulkhead 316 of the left bank of cylinder(s) 104 drop below a certain point, it would not provide enough outlet pressure to the final line regulator 304 (e.g., the final line regulator 304 is set to provide 200 psi outlet pressure; when inlet pressure drops to a value sufficient to no longer allow the regulator to provide 200 psi outlet pressure, that bank of cylinders is essentially empty).

Figure 6:
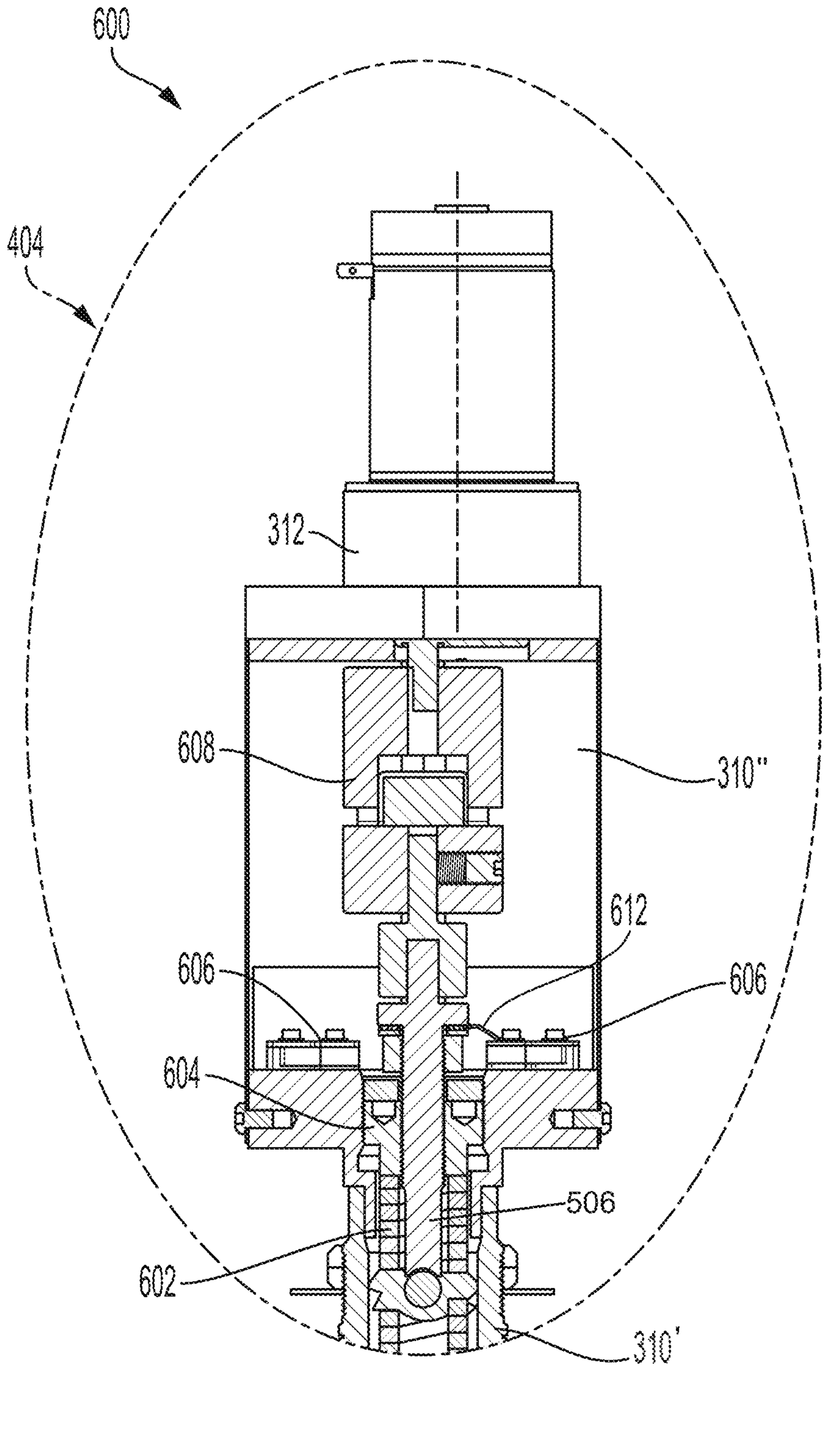
FIG. 6 illustrates a close up view of the internal view of a compensating spring and motor control in connection with a spring biased switchover regulator according to one embodiment of the present disclosure.

FIG. 6 illustrates a close up view 600 of the internal view 404 of compensating spring and motor control 310 in connection with spring biased switchover regulator 302. Compensating spring and motor control 310 may include a compensating spring 602 and a retaining screw 604. Retaining screw 604 adjusts tension in compensating spring 602 to reduce the torque required to turn the adjusting screw 506 during a switchover event enabled by spring biased switchover regulator 302.

In some prior art designs of spring biased switchover regulators, the MAX and MIN pressures are changed manually such as with a lever or control knob. This requires a certain amount of torque in order to make the switch occur. Disclosed compensating spring 602, however, significantly reduces this required torque to near zero and allows for efficient use of motor 312 to move the adjusting screw 506 from one position to another. Thus, compensating spring 602 may be utilized to reduce the force required to turn adjusting screw 506 to allow for a smaller motorized control to be utilized such as motor 312; it does not, however, drive spring biased switchover regulator 302. In some disclosed embodiments, fully automatic switchover system 100 is designed to generally operate off low voltage at approximately 12-24V DC voltage. Compensating spring 602 is one aspect that makes the disclosed invention novel; however, it is readily appreciated that by employing a larger more powerful motor 312, a spring constant of compensating spring 602 may be reduced or compensating spring 602 may even be eliminated altogether such that it would not be required.

The torque required to turn adjusting screw 506 may vary, for example, by the desired switchover pressure. In some designs, smaller motors, for example, may be insufficient for supplying enough torque to otherwise turn adjusting screw 506 without the application of compensating spring 602. A larger, more powerful and/or higher voltage motor may not have the same limitations. While there isn't a requisite minimum amount of torque employed by the current embodiments, in one disclosed embodiment there is a preferrable max torque of motor 312 which is selected at approximately 500 in/oz. It, however, is readily appreciated that if a sufficient motor is sourced, torque is no longer a factor in the design of the disclosed invention. Various motors 312 may be utilized to turn a spring biased switchover regulator adjusting screw 506. These include, but are not limited to AC motors, DC motors, stepper motors, gearbox motors, etc.

A flexible shaft coupling 608 may be employed to couple two shafts to avoid bind up due to concentricity and angularity. In one disclosed embodiment motor 312 drive shaft may be attached to flexible shaft coupling 608. Flexible shaft coupling 608 transfers the motor drive shaft movement to adjusting screw 506. Conceptionally, with proper alignment, the motor 312 could be directly attached to adjusting screw 506. Motor 312 is used to turn the motor controlled regulator adjusting spring 524 on spring biased switchover regulator 302. Turning of adjusting screw 506 increases tension in motor controlled regulator adjusting spring 524. This increased tension creates an increase in the torque required to turn adjusting screw 506. By incorporation of the disclosed compensating spring 602, the torque requirement is greatly diminished. This allows for a smaller, less powerful motor to be employed in accordance with some disclosed embodiment ts.

Micro-switches 606 may be employed and configured to communicate with the control board 306 that the motor 312 has reached the spring biased MAX or MIN pressure required for spring biased switchover to work as desired. Respective tabs 612 are provided that trigger one of two micro-switches 606 to communicate with control board 306 that motor 312 has made the switch to one side or the other when a switchover occurs.

Figure 7:
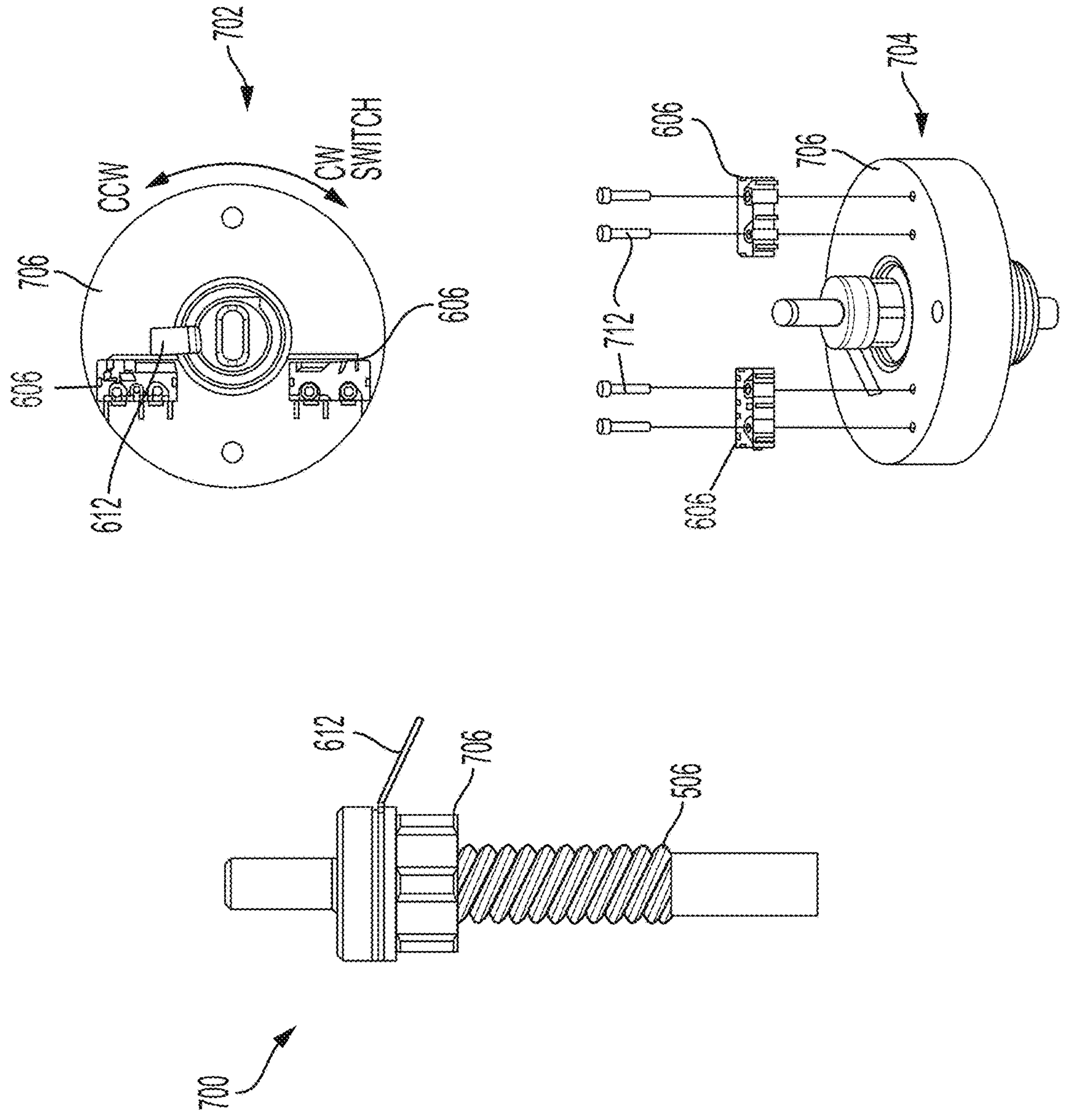
FIG. 7 illustrates an adjusting screw and micro-switch arrangement according to one embodiment of the present disclosure.

FIG. 7 illustrates an adjusting screw and micro-switch arrangement according to one embodiment of the present disclosure. Side view 700 illustrates tab 612 attached to adjusting screw 506, which can be permanently or removably attached by, for example, but not limited to, welding or soldering or by locking it in place with a lock nut 706. Top view 702 and perspective side view 704 illustrate an arrangement of the micro-switch 606 with respect to tab 612 and adjusting screw 506. In one embodiment, micro-switches 606 may be mounted on a base 706 such as with fasteners 712. In one embodiment, fasteners 712 may include threaded connectors such as screws, nails, glues, loop and hook fasteners, or any other suitable means for retaining micro-switches 606 in position on base 706. Adjusting screw 506 with tab 612 mounted to it may be disposed through the center of base 706 and retained therein such that as the adjusting screw 506 is rotated (either clockwise or counterclockwise) therein, tab 612 is rotated to contact one or the other micro-switches 606. Thus, tab 612 may be configured to rotate with adjusting screw 506 as motor 312 turns until it contacts micro-switch 606 in the clockwise (CW) or counterclockwise position (CCW). In some embodiments, micro-switch 606 sends a signal to control board 306 to stop movement of motor 312.

Figure 8:
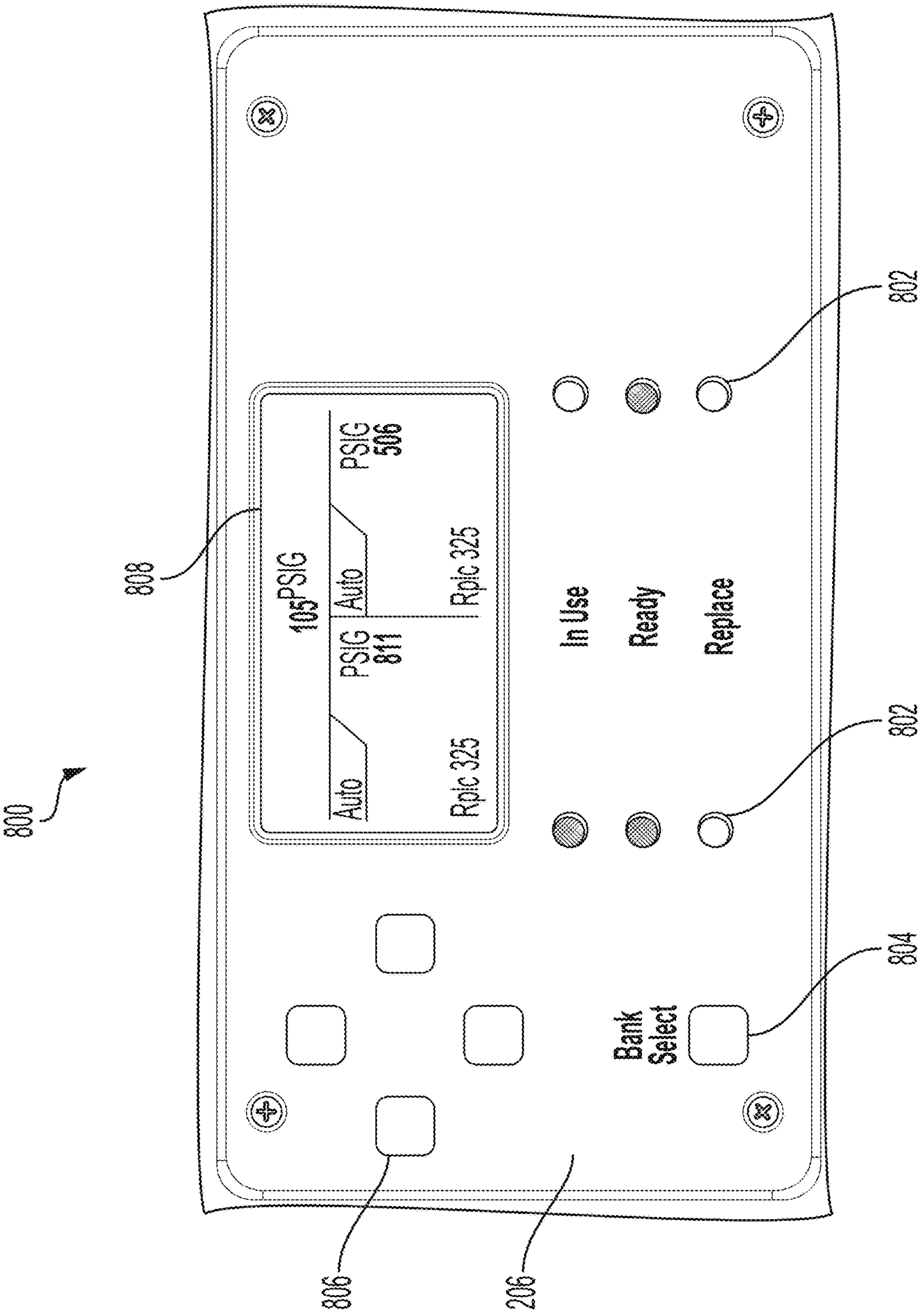
FIG. 8 illustrates a front status display and user input according to one embodiment of the present disclosure.

Display panel 206 is illustrated in FIG. 8 as a front status display and user input 800 according to one embodiment of the present disclosure. High visibility LEDs 802 are disposed on display panel 206 to indicate the status of fully automatic switchover system 100 and may be visible from a distance. In some configurations, embodiments may provide "In-Use" and "Ready" LEDs as typically green and the "Replace" LEDs as typically red. "In-Use" LED shows the current side of gas cylinders 104 being used in fully automatic switchover device 102 of fully automatic switchover system 100. When motor 312 is switching sides, both "In-Use" LEDs flash until switchover to the other side is complete, whereupon the LED for the "switched to" side illuminates and the previous side goes out. As seen in FIG. 8, the "In-Use" and "Ready" LEDS are shown to be illuminated on a left side of the display panel 206, which indicates that the left bank of gas cylinders 104 is being used and the "Ready" LED on a right side of the display panel 206, which indicates that the right bank of gas cylinders 104 is ready to be used.

A manual bank select button 804 is disposed on display panel 206. From time to time, users may need to switch banks manually for any number of reasons; manual bank select button 804 allows that to happen manually. For example, if the pressures are sufficient on both banks of cylinders 104 and the unit (e.g., fully automatic switchover device 102) is set to draw pressure down from the left bank of cylinders 104 first and a user wants to instead draw down the right bank of cylinders 104 first for any reason, the user may press the bank select button 804 and the device (e.g., fully automatic switchover device 102) will switch to the right bank of cylinders 104, for example, as a primary source whereupon motor 312 does the changeover to draw from the right bank of cylinders 104. Otherwise, the fully automatic switchover system 100 is fully automatic.

Navigation buttons 806 may be disposed on display panel 206 that allow user input on various settings on a display screen 808 of fully automatic switchover device 102. In one embodiment, navigation buttons 806 may be configured to include Up-Down-Right-Left directional buttons. Any navigation button selection will bring up a user menu on display screen 808. Display screen 808 may be configured to show the current status of fully automatic switchover system 100, inlet pressures, outlet pressures, units of measure, mode and switchover values.

Figure 9:
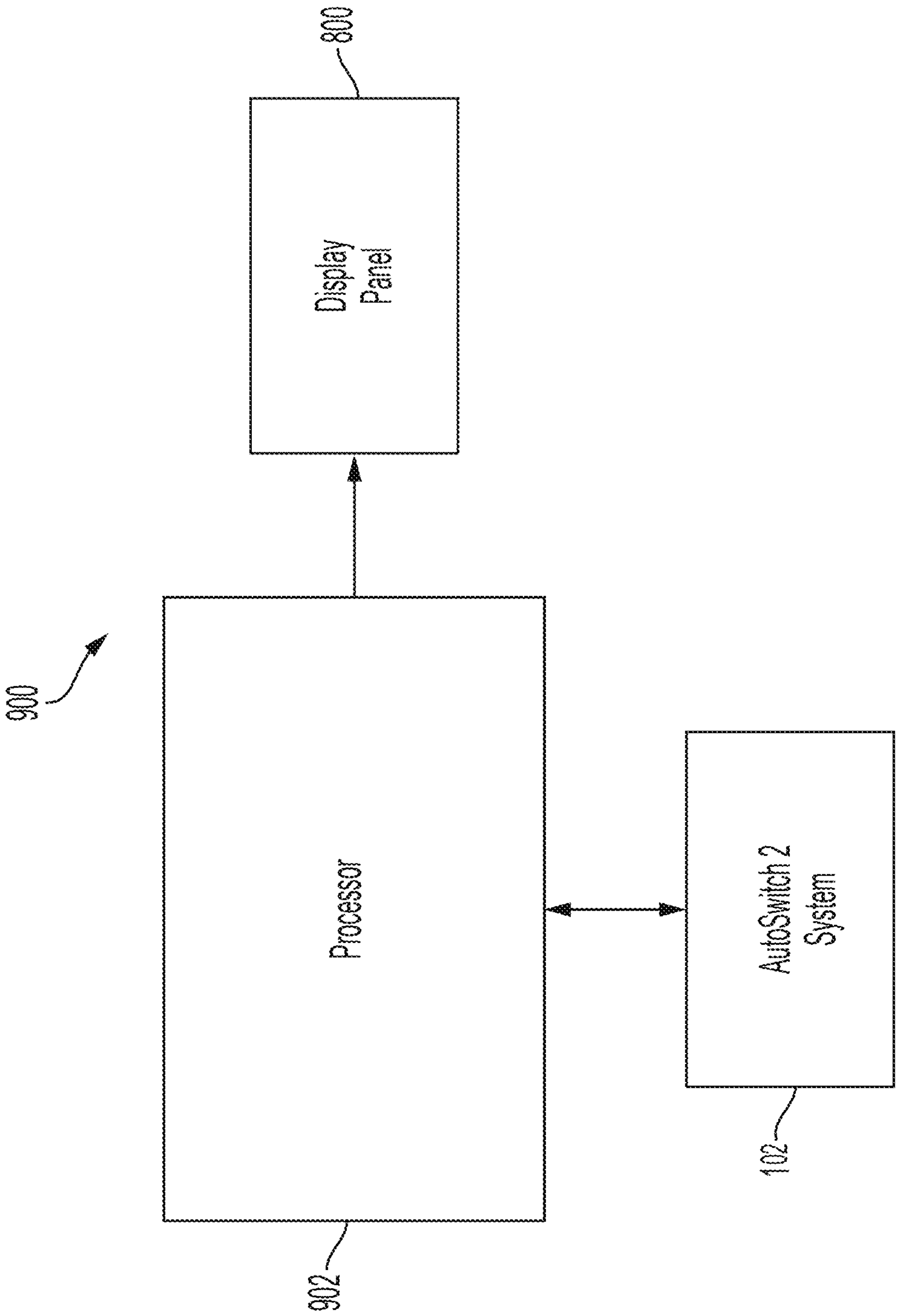
FIG. 9 is a schematic illustration of an overall system setup for a fully automatic switchover system according to one embodiment of the present disclosure.

FIG. 9 provides a schematic illustration 900 of the overall system setup according to one embodiment of the present disclosure. A processor 902 may be electronically configured to communicate with control board 306. In one embodiment, processor 902 and display panel 206 are integral to control board 306. Processor 902 and fully automatic switchover device 102 may, in turn, be electronically configured to communicate with one another, for example, as indicated in the flow chart of FIG. 10. Furthermore, processor 902 may be configured to electronically communicate with front status display and user input 800 based upon status function(s) of fully automatic switchover device 102.

Figure 10:
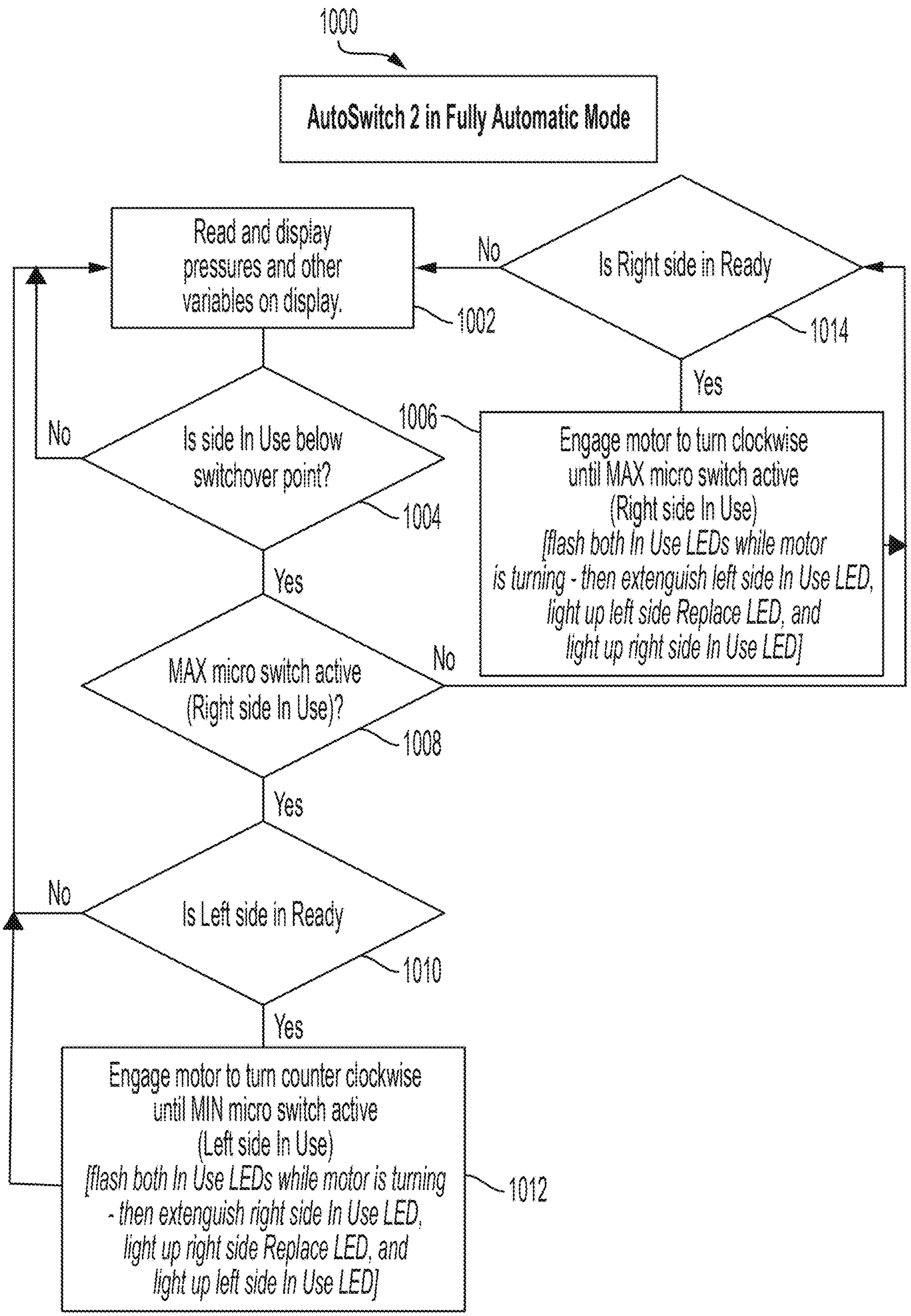
FIG. 10 illustrates a flow diagram of a fully automatic switchover device of a fully automatic switchover system in a fully automatic mode according to one embodiment of the present disclosure.

FIG. 10 illustrates a flow diagram 1000 of fully automatic switchover device 102 of fully automatic switchover system 100 in fully automatic mode according to one embodiment of the present disclosure. Processor 902 of fully automatic switchover device 102 monitors and communicates to constantly evaluate the status of fully automatic switchover system 100 to determine subsequent actions. For example, at step 1002, pressures and other variables may be read and displayed on such as on display screen 808. For example, a user may select the pressure at which the unit determines one bank or the other is empty whereupon a switchover pressure may be displayed on display panel 206. If one bank or the other is empty, display panel 206 will show the status as "EMPTY." If there are error messages, display panel 206 will also indicate the same.

At step 1004, a determination is made concerning whether a side is "In Use" below a switchover point. If the answer is "No" then fully automatic switchover device 102 returns to step 1002.

If the answer is "Yes" then fully automatic switchover device 102 determines if the micro-switch 606 is active at MAX (Right side in Use) at step 1008. If the answer is "No" then fully automatic switchover device 102 goes to step 1014 to determine if the right side is ready. If the answer is "Yes" then fully automatic switchover device 102 engages the motor 312 at step 1006 to turn clockwise until MAX micro switch is active (Right side In Use). At step 1006, front status display and user input 800 of display panel 206 may flash both the "In Use" LEDs while motor 312 is turning; then extinguish the left side "In Use" LED, light up the left side "Replace" LED, and light up the right side "In Use" LED and the fully automatic switchover device 102 returns to step 1002 and processing continues. Alternatively, at step 1014, if the answer is "No" then the fully automatic switchover device 102 returns to step 1002 and processing continues.

Alternatively, at step 1008, if the answer is "Yes" then the fully automatic switchover device 102 goes to step 1010 to determine if the left side is ready. If the answer is No" then then fully automatic switchover device 102 returns to step 1002 and processing continues. If the answer is "Yes" then fully automatic switchover device 102 engages the motor 312 at step 1012 to turn counterclockwise until MIN micro switch is active (left side In Use). At step 1012, front status display and user input 800 of display panel 206 may flash both the "In Use" LEDs while motor 312 is turning; then extinguish the right side "In Use" LED, light up the right side "Replace" LED, and light up the left side "In Use" LED and the fully automatic switchover device 102 returns to step 1002 and processing continues.

In accordance with an embodiment of the present invention, an automated switchover device includes a spring biased switchover regulator having a first inlet for receiving gas from a first gas supply in the first inlet and a second inlet for receiving gas from a second gas supply in the second inlet and an outlet shared by the first inlet and the second inlet; a motor; and an adjusting screw coupled to the motor; wherein the spring biased switchover regulator is configured to monitor and control a maximum and minimum pressure of the first inlet and the second inlet, wherein the motor is configured to turn the adjusting screw in a first rotational direction or a second rotational direction based on a maximum and minimum pressure of the first inlet and the second inlet, and wherein the spring biased switchover regulator is configured to switch over from the first source of gas supply to the second source of gas supply due to the actuation of the adjusting screw by the motor to automatically provide a continuous gas supply.

In accordance with another embodiment of the present invention, an automated switchover device includes: a spring biased switchover regulator having a first inlet for receiving a first gas supply in the first inlet and a second inlet for receiving a second gas supply in the second inlet and an outlet shared by the first inlet and the second inlet; a motor; a compensating spring assembly coupled to the spring biased switchover regulator, wherein the compensating spring assembly comprises a compensating spring and a motor, wherein the compensating spring is in communication with the motor; and an adjusting screw coupled to the motor; wherein the spring biased switchover regulator is configured to monitor and control a maximum and minimum pressure of the first inlet and the second inlet, wherein the motor is configured to turn the adjusting screw in a first rotational direction or a second rotational direction based on a maximum and minimum pressure of the first inlet and the second inlet, and wherein the spring biased switchover regulator is configured to switch over from the first gas supply to the second gas supply due to the actuation of the adjusting screw by the motor to automatically provide a continuous gas supply.

Having described the many embodiments of the present disclosure in detail, it will be apparent that modifications and variations are possible without departing from the scope of the invention defined in the appended claims. Furthermore, it should be appreciated that all examples in the present disclosure, while illustrating many embodiments of the invention, are provided as non-limiting examples and are, therefore, not to be taken as limiting the various aspects so illustrated.

All documents, patents, journal articles and other materials cited in the present application are incorporated herein by reference.

While the present disclosure has been disclosed with references to certain embodiments, numerous modifications, alterations, and changes to the described embodiments are possible without departing from the sphere and scope of the present disclosure, as defined in the appended claims. Accordingly, it is intended that the present disclosure not be limited to the described embodiments, but that it has the full scope defined by the language of the following claims, and equivalents thereof.

What is claimed is:

1. An automated switchover device comprising:

a spring biased switchover regulator having a first inlet for receiving gas from a first gas supply in the first inlet and a second inlet for receiving gas from a second gas supply in the second inlet and an outlet shared by the first inlet and the second inlet;

a motor; and an adjusting screw coupled to the motor;

wherein the spring biased switchover regulator is configured to monitor and control a maximum and minimum pressure of the first inlet and the second inlet, wherein the motor is configured to turn the adjusting screw in a first rotational direction or a second rotational direction based on a maximum and minimum pressure of the first inlet and the second inlet, and wherein the spring biased switchover regulator is configured to switch over from the first source of gas supply to the second source of gas supply due to the actuation of the adjusting screw by the motor to automatically provide a continuous gas supply.

2. The automated switchover device of claim 1, further comprising:

a compensating spring assembly coupled to the spring biased switchover regulator, wherein the compensating spring assembly comprises a compensating spring in communication with the motor.

3. The automated switchover device of claim 2, further comprising:

a retaining screw for adjusting tension of the compensating spring to reduce a torque required to turn the adjusting screw.

4. The automated switchover device of claim 1, wherein transducers are configured to spring biased switchover regulator for reading inlet pressure from the first gas supply and the second gas supply.

5. The automated switchover device of claim 1, wherein a tab is attached to the adjusting screw, wherein the tab is configured to rotate in the first rotational direction or the second rotational direction as the adjusting screw is engaged to turn by the motor, wherein the tab is configured to engage a first micro-switch corresponding to a maximum pressure of a gas supply in the first direction, wherein the tab is configured to engage a second micro-switch corresponding to a minimum pressure of a gas supply in the second direction.

6. The automated switchover device of claim 5, wherein the first micro-switch and the second micro-switch are configured to communicate with a control board to indicate when the first micro-switch and the second micro-switch are engaged and thereby indicate the maximum pressure or the minimum pressures of the gas supply.

7. The automated switchover device of claim 1, wherein the first rotational direction is clockwise and the second rotational direction is counterclockwise.

8. The automated switchover device of claim 1, further comprising:

a control board and processor electronically connected to the spring biased switchover regulator, wherein the control board and processor are configured to monitor the inlet pressure from the first gas supply and the second gas supply and activate the motor to operate in the first rotational direction or the second rotational direction based on the inlet pressure from the first gas supply and the second gas supply.

9. The automated switchover device of claim 8, further comprising:

a status display and user input electronically connected to the processor to indicate the status of the automated switchover device and allow user input to the automated switchover device.

10. The automated switchover device of claim 1, wherein a maximum torque of the motor is approximately 500 in/oz.

11. The automated switchover device of claim 1, wherein the automated switchover system is configured to operate at approximately 12-24V DC voltage.

12. The automated switchover device of claim 1, wherein the automated switchover system has a leak integrity of approximately $1\times10^{-9}$ cc/see of helium.

13. An automated switchover device comprising:

a spring biased switchover regulator having a first inlet for receiving a first gas supply in the first inlet and a second inlet for receiving a second gas supply in the second inlet and an outlet shared by the first inlet and the second inlet;

a motor;

a compensating spring assembly coupled to the spring biased switchover regulator, wherein the compensating spring assembly comprises a compensating spring and a motor, wherein the compensating spring is in communication with the motor; and an adjusting screw coupled to the motor;

wherein the spring biased switchover regulator is configured to monitor and control a maximum and minimum pressure of the first inlet and the second inlet, wherein the motor is configured to turn the adjusting screw in a first rotational direction or a second rotational direction based on a maximum and minimum pressure of the first inlet and the second inlet, and wherein the spring biased switchover regulator is configured to switch over from the first gas supply to the second gas supply due to the actuation of the adjusting screw by the motor to automatically provide a continuous gas supply.

14. The automated switchover device of claim 13, further comprising:

a retaining screw for adjusting tension of the compensating spring to reduce a torque required to turn the adjusting screw.

15. The automated switchover device of claim 13, wherein transducers are configured to spring biased switchover regulator for reading inlet pressure from the first gas supply and the second gas supply.

16. The automated switchover device of claim 13, wherein a tab is attached to the adjusting screw, wherein the tab is configured to rotate in the first rotational direction or the second rotational direction as the adjusting screw is engaged to turn by the motor, wherein the tab is configured to engage a first micro-switch corresponding to a maximum pressure of a gas supply in the first direction, wherein the tab is configured to engage a second micro-switch corresponding to a minimum pressure of a gas supply in the second direction.

17. The automated switchover device of claim 16, wherein the first micro-switch and the second micro-switch are configured to communicate with a control board to indicate when the first micro-switch and the second micro-switch are engaged and thereby indicate the maximum pressure or the minimum pressures of the gas supply.

18. The automated switchover device of claim 13, wherein the first rotational direction is clockwise and the second rotational direction is counterclockwise.

19. The automated switchover device of claim 13, further comprising:

a control board and processor electronically connected to the spring biased switchover regulator, wherein the control board and processor are configured to monitor the inlet pressure from the first gas supply and the second gas supply and activate the motor to operate in the first rotational direction or the second rotational direction based on the inlet pressure from the first gas supply and the second gas supply.

20. The automated switchover device of claim 19, further comprising:

a status display and user input electronically connected to the processor to indicate the status of the automated switchover device and allow user input to the automated switchover device.

* * * * *